United States Patent Office 3,453,258
Patented July 1, 1969

3,453,258
REACTION PRODUCTS OF CYCLODEXTRIN AND UNSATURATED COMPOUNDS
Stanley M. Parmerter, Wheaton, Earle E. Allen, Jr., Chicago, and Glenn A. Hull, Oak Park, Ill., assignors to Corn Products Company, New York, N.Y., a corporation of Delaware
No Drawing. Filed Feb. 20, 1967, Ser. No. 617,037
Int. Cl. C13l 1/10; C08b 25/02; A23l 1/22
U.S. Cl. 260—209        11 Claims

ABSTRACT OF THE DISCLOSURE

Compositions of matter represented by the formula

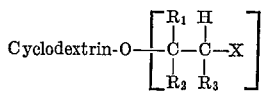

where $R_1$, $R_2$ and $R_3$ may be hydrogen, alkyl, cycloalkyl or aryl; and where X is a substituted functional group so that the products are substituted cyclodextrin ethers. A method for making the compositions of matter comprises reacting the cyclodextrin with an activated vinyl compound of the formula

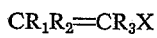

where the substituted functional group represented by X may be formyl, cyano, carbonyl, carbonyl alkyl, amido, alkyl sulfonyl and the like. The products of the invention may be used as complexing agents in order to form inclusion compounds and complexes with various chemicals and materials in ways which are similar to those which are known relative to the cyclodextrins.

---

This invention relates to cyclodextrin products, namely, substituted ethers of cyclodextrin; and the invention also relates to methods of making such products or compositions of matter by reacting the cyclodextrin with a substituted vinyl compound in which an electron attracting group activates the double bond of the vinyl compound.

The cyclodextrins have been known in the art as cyclic compounds prepared from starches by enzymes elaborated by *Bacillus macerans*. The cyclodextrins are also known as Schardinger dextrins from an early investigator who studied these materials. These cyclodextrins are homologous cyclic molecules containing 6 or more α-D glucopyranose units linked together at the 1,4 positions as in amylose. The cyclic molecule may also be referred to as a torus, and the cyclic molecule arrangement of this torus is characterized by having no reducing end groups. The torus molecule is depicted in the following schematic formula, where the anhydroglucose units are shown linked at the 1,4 positions, and the hydroxyls are shown at the 2,3 and 6 positions of the illustrated units.

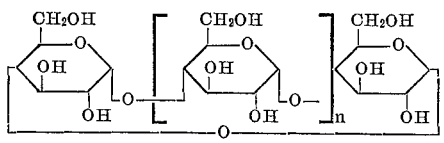

When $n$ is 4, the torus molecule illustrated is known as the α-cyclodextrin or cyclohexaamylose because the torus contains six anhydroglucose units. When $n$ is 5, the seven unit member is known as β-cyclodextrin or cycloheptaamylose; and when $n$ is 6, the eight unit member is known as γ-cyclodextrin or cyclooctaamylose. When reference is made here to the "torus molecule" or to "cyclodextrins" it is intended that such terms include the foregoing forms as well as still other tori which have a still larger number of units in the molecule.

It is one primary object of this invention to provide new cyclodextrin compounds which can be used to exploit their clathrating properties, and it is a related object to provide new and practical processes for the production of these new compounds.

It is another object to provide new cyclodextrin compounds that can be usefully employed as intermediates for the preparation of other useful compositions of matter.

Still another object of this invention is to provide new cyclodextrin compounds which retain their cyclic configuration so that they may be usefully employed to form inclusion compounds with a variety of materials.

A still further object of the invention is to provide a practical method for making new cyclodextrin compounds of the character described, particularly a relatively simple and economical process for making cyclodextrin substituted alkyl ethers so that they may have greater commercial application.

Other objects of the invention will occur to practitioners from considering the disclosure in the following specification and the recitals of the appended claims.

The substituted cyclodextrin ethers of this invention may be represented by the following formula

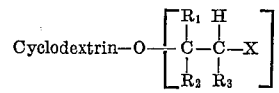

where $R_1$, $R_2$ and $R_3$ may be hydrogen, alkyl, aryl and cycloalkyl. The X substituent is a functional group which may include: —CN, —CO-alkyl, —CONH$_2$, —SO$_2$-alkyl, and —CHO.

As is known, the anhydroglucose unit, of the type which is present in cyclic form in the cyclodextrin, may have various degrees of substitution (D.S.) of from a small but detectable amount, less than 1, to the maximum level of 3. According to the present understanding of the art, the six position hydroxyl group in the anhydroglucose unit is the most reactive; the hydroxyl group at the two position is considered to be the next most reactive; and the hydroxyl group at the three position appears to be the least reactive. Moreover, the six position hydroxyl group usually will undergo a more extensive substitution or addition than the hydroxyls at the two and three positions, but it may be otherwise. Irrespective of the actual sequence or the number of anhydroglucose units involved, the formula illustrated above is intended to represent the products of this invention wherein the bracketed substitution may occur to various degrees of substitution at all or less than all anhydroglucose units in the cyclodextrin, and at one or more of the hydroxyl groups in a given anhydroglucose unit. The cyclodextrin moiety, as mentioned, may include at least 6 and up to 9, or even more, cyclic anhydroglucose units joined by 1,4 linkages.

The products of this invention are obtained by reacting a cyclodextrin with an unsaturated compound, particularly, a vinyl compound in which the double bond is activated by a substituted electron attracting group.

Cyclodextrin is produced from starch by the action of an enzyme commonly known as cyclodextrin transglucosylase (*B. macerans amylase*). The source of the enzyme is usually a culture of *Bacillus macerans* which is grown under conventional conditions on conventional media containing sources of nitrogen, carbon, growth factors and minerals. The cyclodextrin transglucosylase may be produced by following published teachings such as, for example, those described by D. French in Methods in Enzymology, S. P. Colowick and N. O. Kaplan, editors, Academic Press, New York, N.Y., vol. V., 1962, pp. 148–155.

The cyclodextrin transglucosylase activity in cultures of *Bacillus macerans* may be measured by the Tilden-Hudson procedure as described by these two workers in J. Bacteriol., 43, 527–544, 1942. In general, the cyclodextrin transglucosylase is added to a dilute solution of a gelatinized starch, whereupon a conversion to the cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gamma, may be fractionated by procedures such as those described by D. French et al., J. Am. Chem. Soc., 71, 353 (1949). The various homologous cyclodextrins, having from six to eight units, or higher, and their mixtures, may be used as equivalent starting materials to prepare the new compounds of this invention. In practice, there may be little reason for separating the various fractions, and starting materials may be conveniently employed which constitute a preponderance of $\beta$-cyclodextrin, for example. As stated, no distinction is intended between the various cyclodextrins or their mixtures unless otherwise indicated when using the term "cyclodextrin."

The unsaturated and activated vinyl reactants may be represented by the following formula

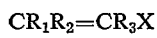
$$CR_1R_2 = CR_3X$$

where $R_1$, $R_2$ and $R_3$ are substituents as previously recited. The X substituent is an electron attracting group which activates the double bond, and which may be the same as the substituents previously described in the formula which depicts the new products of this invention.

The activated vinyl reactants may be selected from a variety of compounds such as acrylonitrile, acrylamide, acrolein, methyl vinyl ketone, methyl isopropenyl ketone, methacrylamide, methacrylonitrile, and others. Certain vinyl compounds have groups which are not sufficiently electron attracting, therefore, they do not represent a substituted vinyl compound in which the group activates the double bond. Among such recognized insufficient electron attracting groups are the alcohols and salts of organic carboxy acids.

The following examples are presented to teach representative preparations of the substituted alkyl ether products of cyclodextrin, but such examples should not be construed as exclusive embodiments since they are intended only as illustrations. All parts and percentages are by weight unless specified otherwise.

EXAMPLE 1

Cyanoethyl ether of cyclodextrin (lower D.S.)

A slurry was made from 113 grams of $\beta$-cyclodextrin and 50 ml. of 10% sodium hydroxide. To the slurry was added, with stirring, 37 grams of acrylonitrile at 55° C. The mixture was stirred for 30 minutes at this temperature, and then the mixture is poured into three liters of methanol, whereupon a white precipitate is separated. The precipitate is collected, dried, and recrystallized from hot methanol. The product contains 5.19% nitrogen which corresponds to a D.S. of 0.75.

EXAMPLE 2

Cyanoethyl ether of cyclodextrin (intermediate D.S.)

To a mixture of 28 g. of $\beta$-cyclodextrin and 70 ml. of acrylonitrile at 50° C. was added dropwise with stirring 10 ml. of 2% sodium hydroxide solution. It was stirred for 15 minutes at 50° C. and then for 24 hours at 25° C. Petroleum ether was added. The gummy product was separated, washed with petroleum ether, and dissolved in acetone. Addition of petroleum ether to the acetone solution reprecipitated the product. The yield of white powder was 29 g. Nitrogen analysis of 9.04% corresponds to a D.S. of 1.2.

EXAMPLE 3

Cyanoethyl ether of cyclodextrin (higher D.S.)

To 70 ml. of acrylonitrile at 55° C was added 40 g. of the product from Example 1. The mixture was stirred while 10 ml. of 3% sodium hydroxide solution was added dropwise. Stirring was continued for 2 hours at 55°–60° C. before the mixture was left at room temperature for 5 days. The solid all dissolved to give a yellow viscous solution. Petroleum ether was added to precipitate the product. This was washed with petroleum ether and dissolved in chloroform. A solid separated when the solution was stirred into a large volume of methanol. The solid was ground under methanol and dried in vacuo at 70° C. to give 48.6 g. of product containing 12.6% nitrogen corresponding to a D.S. of 2.8. Crystallization from boiling methanol gave a white solid, MP. 121°–125° C.

EXAMPLE 4

Carbamoylethyl ether of cyclodextrin (lower D.S.)

To a mixture of 113 g. of $\beta$-cyclodextrin and 75 ml. of 20% sodium hydroxide solution was added 50 g. of acrylamide with stirring. The mixture was stirred at 50°–60° C. for 18 hours before the pH was adjusted to 6.5 with 2 N hydrochloric acid. When the mixture was stirred into a large volume of methanol the product solidified. It was ground under methanol and dried to give 87 g. of white product. Analysis indicated 1.98% nitrogen corresponding to a D.S. 0.25.

EXAMPLE 5

Carbamoylethyl ether of cyclodextrin (intermediate D.S.)

The procedure of Example 4 was followed using 28 g of $\beta$-cyclodextrin, 45 g. of acrylamide and 50 ml. of 40% benzyltrimethyl ammonium hydroxide solution. The yield of product containing 6.68% nitrogen corresponding to a D.S. of 1.08 was 21 g.

EXAMPLE 6

Acetylethylether of cyclodextrin

A slurry of 59 g. of $\beta$-cyclodextrin in 120 ml. of water was adjusted to pH 10.0 with 2 N sodium hydroxide. The 49 g. of methyl vinyl ketone was added slowly with stirring and the mixture was stirred at 50° C. for 18 hours. The product separated as the mixture was poured into acetone. It was separated and washed thoroughly with acetone and ether. Yield of product was 41 g. The oxime, which was prepared by the method reported by Rochas and Gavet, Bull. Inst. Textile France, 19 (1960), contained 3.35% N. This corresponds to a D.S. of 0.46.

EXAMPLE 7

Cyanoethyl ether of $\alpha$-cyclodextrin

The procedure of Example 3 was followed using 9.7 g. of $\alpha$-cyclodextrin, 20 ml. of acrylonitrile and 3 ml. of 3% sodium hydroxide solution. The gummy product obtained by petroleum ether precipitation became solid after stirring under acetone and petroleum ether mixtures. The product, 12 g., contained 4.76% N which corresponds to a D.S. of 0.6.

The substituted cyclodextrin ethers of this invention are adapted for useful application for purposes of clathration or for forming inclusion compounds in ways similar to those demonstrated by cyclodextrins as such. It will be appreciated that many of the products of this invention may be used as complexing agents or to form inclusion compounds and complexes with various chemicals and materials in ways which are similar to those which are known relative to the cyclodextrins. For example, inclusion compounds may be formed from flavoring agents or the like. In addition, the compounds may be usefully employed as intermediates for making other useful and products. For example, the cyano substituted alkyl ether of Example 1 and the carbamoyl alkyl ether of Example 2 can be subjected to hydrolysis to obtain the carboxyethyl derivatives which impart anionic properties to the cyclodextrin product. Such anionic products have useful properties regarding enhanced water solubility and other uses, such as in the paper industry. The manner of preparing such anionic products and a disclosure of their uses are further described in co-pending application Ser. No. 615,331, filed Feb. 13, 1967. In addition, the cyano alkyl ether of Example 1 can be reduced to form the primary amino ether which, in turn, is an intermediate for preparing useful quaternary ammonium compounds which have useful cationic properties as described more fully in co-pending application Ser. No. 615,314, filed Feb. 13, 1967.

The ketone alkyl ether products may be reacted with a Girard's reagent, a cationic hydrazide, to obtain corresponding cationic compounds which may also be used for the purposes disclosed in the foregoing co-pending application. The sulfonyl ether products may be of the type where the sulfone group itself is substituted with another vinyl radical to provide a situs for crosslinking to another cyclodextrin molecule, or to other compounds bearing active hydrogens.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A substituted ether of cyclodextrin of the formula

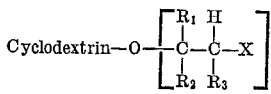

where $R_1$, $R_2$ and $R_3$ are of the class of hydrogen, alkyl, aryl and cycloalkyl, and X is an electron attracting substituent of the type which activates the double bond of a vinyl compound of the formula $$CR_1R_2 = CR_3X$$

said vinyl compound adapted to be reacted with a cyclodextrin to obtain said substituted ether of cyclodextrin.

2. A substituted ether as in claim 1 wherein X is of the class of cyano, formyl, carbonyl, carbonyl alkyl, amido, and alkyl sulfonyl.

3. A product as in claim 2 wherein $R_1$, $R_2$ and $R_3$ are hydrogen.

4. A product as in claim 2 wherein $R_1$ and $R_2$ are hydrogen and $R_3$ is methyl.

5. A product as in claim 3 wherein the cyclodextrin moiety has a plurality of anhydroglucose units of 6 and more than 6, and the expression within the bracket represents an average degree of substitution per anhydroglucose unit in the cyclodextrin; and said product is a cyano ethyl ether of cyclodextrin of the formula Cyclodextrin—O[CH$_2$CH$_2$CN]

6. A product as in claim 3 which is a carbamoylethyl ether of the formula

Cyclodextrin—O[CH$_2$CH$_2$CONH$_2$]

7. A product as in claim 3 which is an acetylethyl ether of the formula

Cyclodextrin—O[CH$_2$CH$_2$COCH$_3$]

8. A product as in claim 3 which is a methyl sulfonyl ethyl ether of the formula Cyclodextrin—O[CH$_2$CH$_2$SO$_2$CH$_3$]

9. A product as in claim 3 which is a propionaldehyde ether of the formula

Cyclodextrin—O[CH$_2$CH$_2$CHO]

10. A product as in claim 4 wherein the cyclodextrin moiety has a plurality of anhydroglucose units of 6 and more than 6, the expression within the bracket represents an average degree of substitution per anhydroglucose unit in the cyclodextrin, and said product is a cyano isopropyl ether of the formula

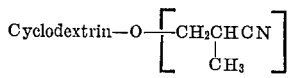

11. A product as in claim 4 which is a carbamoyl isopropyl ether of the formula

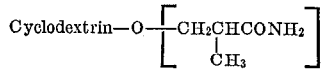

References Cited

UNITED STATES PATENTS

| | | | |
|---|---|---|---|
| 2,539,704 | 1/1951 | Schoeng et al. | 260—209 |
| 2,827,452 | 3/1958 | Schlenk et al. | |
| 3,140,184 | 7/1964 | Robbins. | |
| 3,210,375 | 10/1965 | Porret et al. | 260—209 |
| 3,222,358 | 12/1965 | Touey et al. | 260—209 |
| 3,225,028 | 12/1965 | Nordgren | 260—209 |
| 3,346,555 | 10/1967 | Nordgren | 260—209 |

LEWIS GOTTS, *Primary Examiner.*

JOHNNIE R. BROWN, *Assistant Examiner.*

U.S. Cl. X.R.

99—140; 162—175